United States Patent [19]
Cairns

[11] Patent Number: 5,738,535
[45] Date of Patent: Apr. 14, 1998

[54] UNDERWATER CONNECTOR

[75] Inventor: James L. Cairns, Ormond Beach, Fla.

[73] Assignee: Ocean Design, Inc., Ormond Beach, Fla.

[21] Appl. No.: 612,371

[22] Filed: Mar. 7, 1996

[51] Int. Cl.$^6$ .................................................. H01R 13/44
[52] U.S. Cl. ...................... 439/138; 439/201; 439/310; 439/271
[58] Field of Search ........................ 439/137–139, 439/143, 201, 199, 205, 203, 204, 271, 587, 310; 385/56, 58, 60

[56] References Cited

U.S. PATENT DOCUMENTS

| | | | |
|---|---|---|---|
| 3,982,804 | 9/1976 | Marechal | 439/139 |
| 4,203,640 | 5/1980 | Bice et al. | 439/139 |
| 4,606,603 | 8/1986 | Cairns | 350/96.21 |
| 4,616,900 | 10/1986 | Cairns | 350/96.2 |
| 4,666,242 | 5/1987 | Cairns | 350/96.21 |
| 4,673,242 | 6/1987 | Logan et al. | 350/96.2 |
| 4,753,611 | 6/1988 | Kobler | 439/578 |
| 4,773,725 | 9/1988 | Ashman et al. | 350/96.2 |
| 4,795,359 | 1/1989 | Alcock et al. | 439/271 |
| 4,865,563 | 9/1989 | Ney et al. | 439/404 |
| 4,878,731 | 11/1989 | Caron et al. | 350/96.21 |
| 4,929,184 | 5/1990 | Emadi et al. | 439/681 |
| 4,948,377 | 8/1990 | Cairns | 439/200 |
| 5,171,158 | 12/1992 | Cairns | 439/199 |
| 5,194,012 | 3/1993 | Cairns | 439/201 |
| 5,217,391 | 6/1993 | Fisher, Jr. | 439/578 |
| 5,234,350 | 8/1993 | Marechal et al. | 439/139 |

FOREIGN PATENT DOCUMENTS

| | | | |
|---|---|---|---|
| 0141746 | 5/1985 | European Pat. Off. | |
| 0538089 | 4/1993 | European Pat. Off. | |
| 615452 | 7/1935 | Germany | 439/139 |
| 1356080 | 11/1987 | U.S.S.R. | 439/139 |
| 2166261 | 4/1986 | United Kingdom. | |

*Primary Examiner*—Gary F. Paumen
*Attorney, Agent, or Firm*—Brown, Martin, Haller & McClain

[57] ABSTRACT

An underwater electrical or optical connector assembly has a plug unit containing at least one contact element in a bore within the plug body and a receptacle unit containing at least one contact element in a bore aligned with the plug bore when the two parts are mated together. Each of the bores terminates in an enlarged, recessed seat at the front or mating face of the respective unit, and a seal member is movably mounted in each seat. Each seal member has a through bore aligned with the respective bores in the two units when in an open position, and offset from the contact element bores in a closed position so as to seal the bores until the parts are connected. Portions of each seal member project outwardly from the front face to make a good seal when the two front faces are pushed together. The seal members are actuated to move from the closed position to the open position automatically as the two units are mated, and the contact element in the plug unit then extends out of the plug body through the aligned seal member through bores and into the receptacle bore to contact the corresponding receptacle contact element.

33 Claims, 12 Drawing Sheets

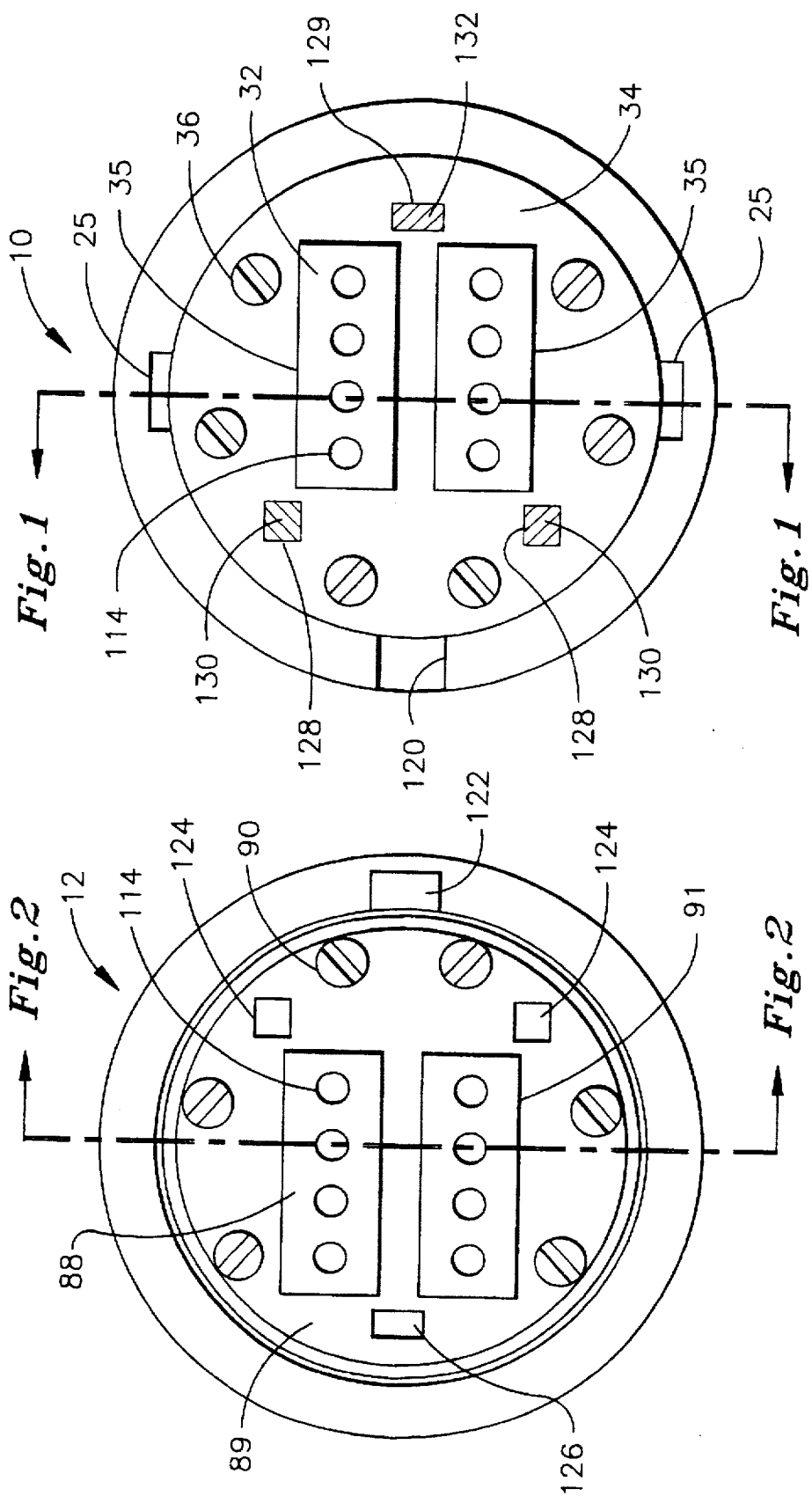

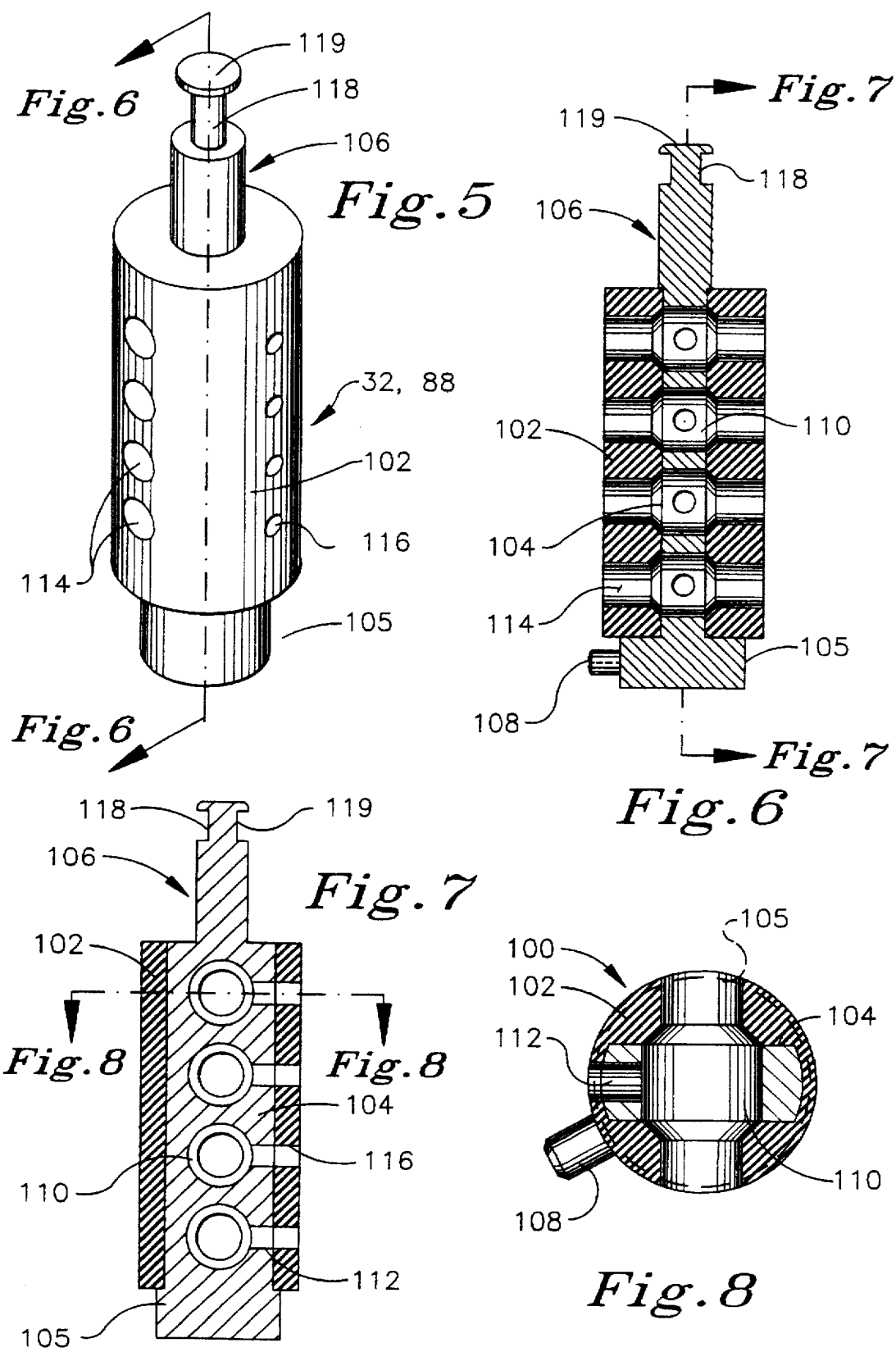

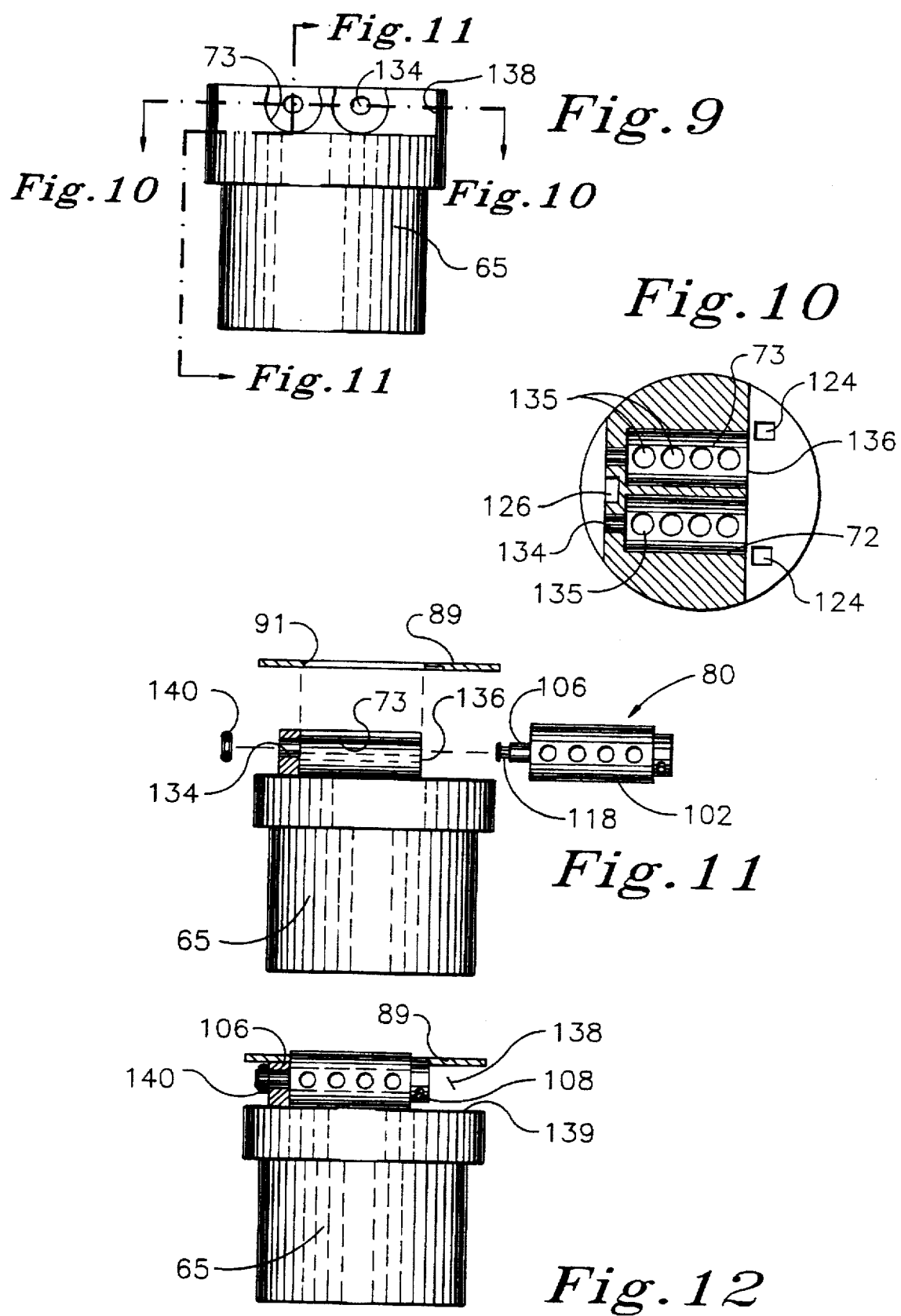

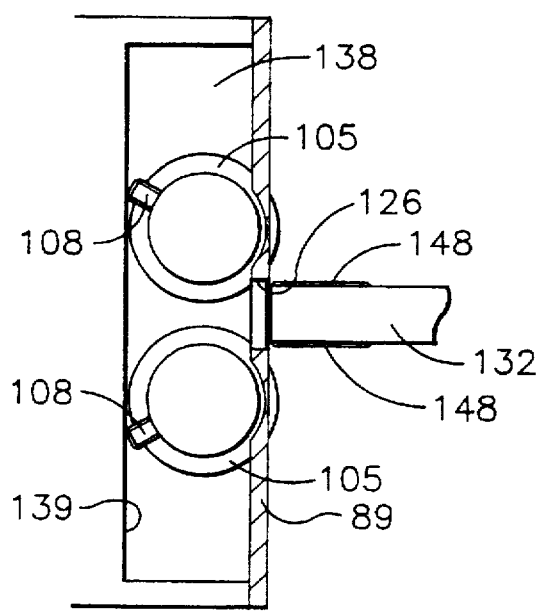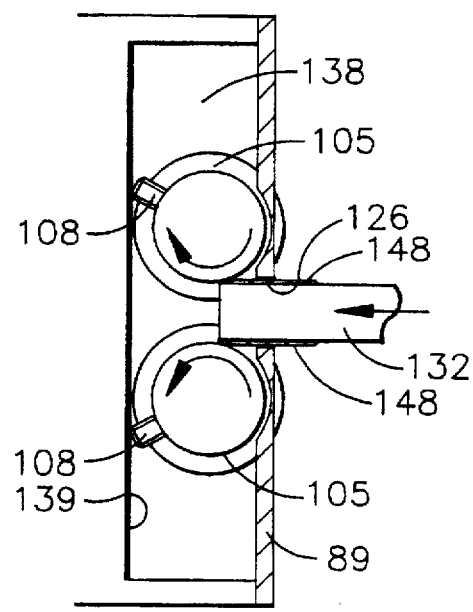
*Fig. 14A*  *Fig. 14B*
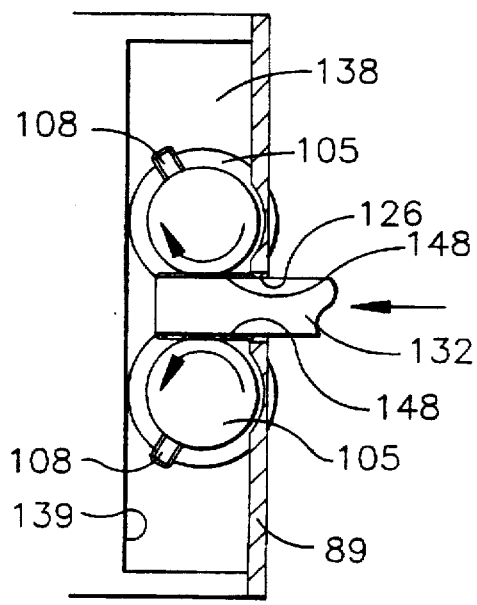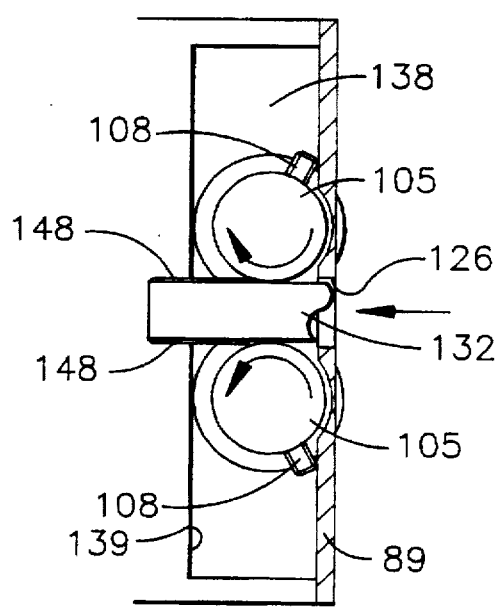
*Fig. 14C*  *Fig. 14D*

UNDERWATER CONNECTOR

CROSS-REFERENCES TO RELATED APPLICATIONS

This application is related to my co-pending application Ser. No. 08/375,957, filed Jan. 20, 1995.

BACKGROUND OF THE INVENTION

The present invention relates to an underwater pin and socket type connector for making connections of electrical or fiber-optic circuits in harsh environments, such as great ocean depths.

There are many types of connectors for making electrical and fiber-optic cable connections in hostile environments. One type includes connectors for undersea mating and demating. Such underwater connectors typically comprise a plug unit containing one or more contact probes and a receptacle unit containing an equivalent number of receptacle contacts or junctions for engagement with the contact probes, which extend into the receptacle unit when the units are connected together. Typically, the contacts or junctions are contained in a sealed chamber containing dielectric fluid, and the probes enter the chamber via one or more normally sealed openings. One major problem in designing such units is the provision of seals which will adequately exclude seawater from the contact chamber even after repeated mating and demating, and also prevent dielectric fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. In the mated condition, the sphincter pinches against the entering probe to form a seal. Although this type of seal is successful in some cases, it does have disadvantages. One disadvantage is that this seal does not work well under all hostile conditions. Another disadvantage is that such seals tend to lose their "memory" after repeated mating and demating, so that they may fail to close completely, or may not close quickly enough to isolate the chamber from the surrounding environment when the units are demated. Another type of known seal mechanism comprises a piston which moves axially into the seal opening as the units are demated.

In some known underwater electrical connectors, such as that described in my U.S. Pat. Nos. 4,795,359 and 5,194,012, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in an optical connector since the optical contacts must be able to engage axially for practical purposes.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated. Other known fiber-optic connectors have similar seals which are not suitable for use under some conditions and may tend to lose effectiveness after repeated mating and demating.

Known seal mechanisms are not completely effective in providing repeatable, reliable optical and electrical connections in adverse environments while maintaining electrical or optical contacts or terminals in isolated chambers at all times. Optical connectors which are currently available are extremely expensive and generally require complicated means for terminating the connector elements or junctions to the cables they are intended to connect. Up to now, none of the known connectors have been ideal for making repeated and reliable optical and electrical connections in hostile environments such as the greatest ocean depths.

SUMMARY OF THE INVENTION

It is an object of the present invention to provide a new and improved connector for making connections between optical fiber cables, electrical cables, or electro-optical cables in hostile environments, such as underwater.

According to the present invention, a connector assembly is provided which comprises a mateable plug unit and receptacle unit, the receptacle unit having a first end and a second, mating end, at least one bore extending inwardly from the mating end of the receptacle unit and having an enlarged, recessed seat at the mating end, a receptacle contact element mounted in the bore, a seal member movably mounted in the seat portion, the seal member having a through bore and being movable in a non-axial direction relative to the axis of the receptacle unit between a first, closed position in which the through bore is offset from the receptacle bore and the end of the receptacle bore is sealed, and a second, open position in which the seal through bore is aligned with the receptacle bore, the plug unit having a first end and a second, mating end for engagement with the second end of the receptacle unit, the second end of the plug unit having at least one opening aligned with the bore in the receptacle unit and a contact element slidably mounted in the plug unit for projecting out of the opening and through the seal member bore into the receptacle unit bore to contact the receptacle contact element when the seal member is in the open position.

Preferably, the plug unit has an identical recessed seat at its mating end at the plug contact element opening and a matching seal member movably mounted in the seat, the seal member having a through bore and being movable between a closed position in which the through bore is offset from a plug bore in which the contact element is mounted, and an open position in which the through bore is aligned with the plug bore.

In a preferred embodiment of the invention, each recessed seat has a surface which is at least partially curved, and the seal member has a matching curved outer surface and is rotatably mounted in the seat for rotation between the closed and open positions. The seal member may be disc-shaped or spherical, but in the preferred embodiment each seal member is cylindrical and the mating seats are of part-cylindrical shape. Each cylindrical seal member is rotatably mounted in the respective seat for rotation about its longitudinal axis, and the through bore extends transversely through the longitudinal axis. Thus, the seal members roll from the closed to the open position as the units are connected together. The seal members are preferably of slightly larger dimensions than the cylindrical dimensions of the seat, so that they are compressed slightly to form a better seal.

Preferably, the receptacle unit has a series of parallel bores each containing a contact element in a receptacle body, and each of the bores terminates in the same recessed area in a front face of the body. The seal member has a series of transverse, parallel through bores extending across its diameter at spacings matching the spacing between the receptacle unit bores. The seal member is rotatably retained in the recess so that a portion of the seal projects outwardly through the outwardly facing opening. One or more such seal members may be rotatably mounted in matching recesses in the front face of the receptacle and plug units, depending on the number of contacts to be made in the connection.

The plug unit preferably comprises a hollow outer shell with a fixed rear end and a plug manifold slidably mounted in the shell. The or each contact element extends slidably through an aligned bore in the plug manifold and is fixed in the rear end of the shell, such that when the manifold is urged inwardly into the shell, the contact element projects outwardly through the forward end of the manifold and into the receptacle unit for contact with the corresponding receptacle contact element.

In a preferred embodiment, both the plug and receptacle unit have an internal chamber communicating with the or each contact element bore which is filled with a benign fluid such as an optically clear dielectric fluid or oil. Preferably, each of the seal members has at least one bleed port extending from one side of the member transversely into the seal through bore, and the bleed port is aligned with the respective bore in the receptacle or plug unit when the seal member is in the closed position, allowing the through bore to be filled with fluid. Where each seal member has a series of through bores, a corresponding number of bleed ports is provided so that each through bore is filled with fluid in the closed position of the seal member.

Due to the fact that each rolling seal member has an elastomeric portion which preferably projects partially out of the front or mating face of the respective connector unit, a very effective seal will be made when the two end faces are pushed together. This acts to compress the projecting seal portions, forcing any moisture away from the seals. Additionally, as the seal members are rolled between the closed position and the open position, which occurs automatically as the two units are mated, any debris is also rolled out of the region between the seals. Finally, since the seal through bores are already filled with fluid as they arrive at the open position, moisture is effectively excluded as the junction is made. This produces a double-acting seal which is extremely reliable and easy to actuate over repeated mating and demating, and which is particularly useful in an underwater optical or electrical connector.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 3 is an end elevational view of a mating end face of the plug unit;

FIG. 4 is an end elevational view of the corresponding mating end face of the receptacle unit;

FIG. 5 is a perspective view of one of the rolling seals used in the end faces of the plug and receptacle units;

FIG. 6 is a section on the lines 6—6 of FIG. 5;

FIG. 7 is a section on the lines 7—7 of FIG. 6;

FIG. 8 is a section on the lines 8—8 of FIG. 7, showing only the rigid core of the seal without the outer elastomeric member;

FIG. 9 is a side elevational view of the receptacle manifold block prior to insertion of the rolling seals and attachment of the end plate;

FIG. 10 is a section on the lines 10—10 of FIG. 9;

FIG. 11 is a partial section on the lines 11—11 of FIG. 9, illustrating a first step in installation of one of the rolling seals;

FIG. 12 is a section similar to FIG. 11 but showing the rolling seal installed in the cavity and secured with the end plate;

FIGS. 14A-D are partial side elevational views of the receptacle unit rolling seals and actuator rod at successive positions as the seal is rolled from a fully closed to a fully open position;

DESCRIPTION OF THE PREFERRED EMBODIMENT

The drawings illustrate a two part underwater connector for connecting optical, electrical, or electro-optical cables. In the illustrated embodiment, the connector is designed for making a fiber-optic connection. However, it will be understood that the same connector may be modified for making an electrical or electro-optical connection in an equivalent fashion. Additionally, an eight-way fiber-optic connector is illustrated by way of example only, and it will be understood that the connector may alternatively be designed for making a greater or lesser number of connections, depending on the application. The connector may be used for making connections in any harsh environment, not only underwater or at great ocean depths, although it is particularly intended for use in underwater applications.

Figure 1:
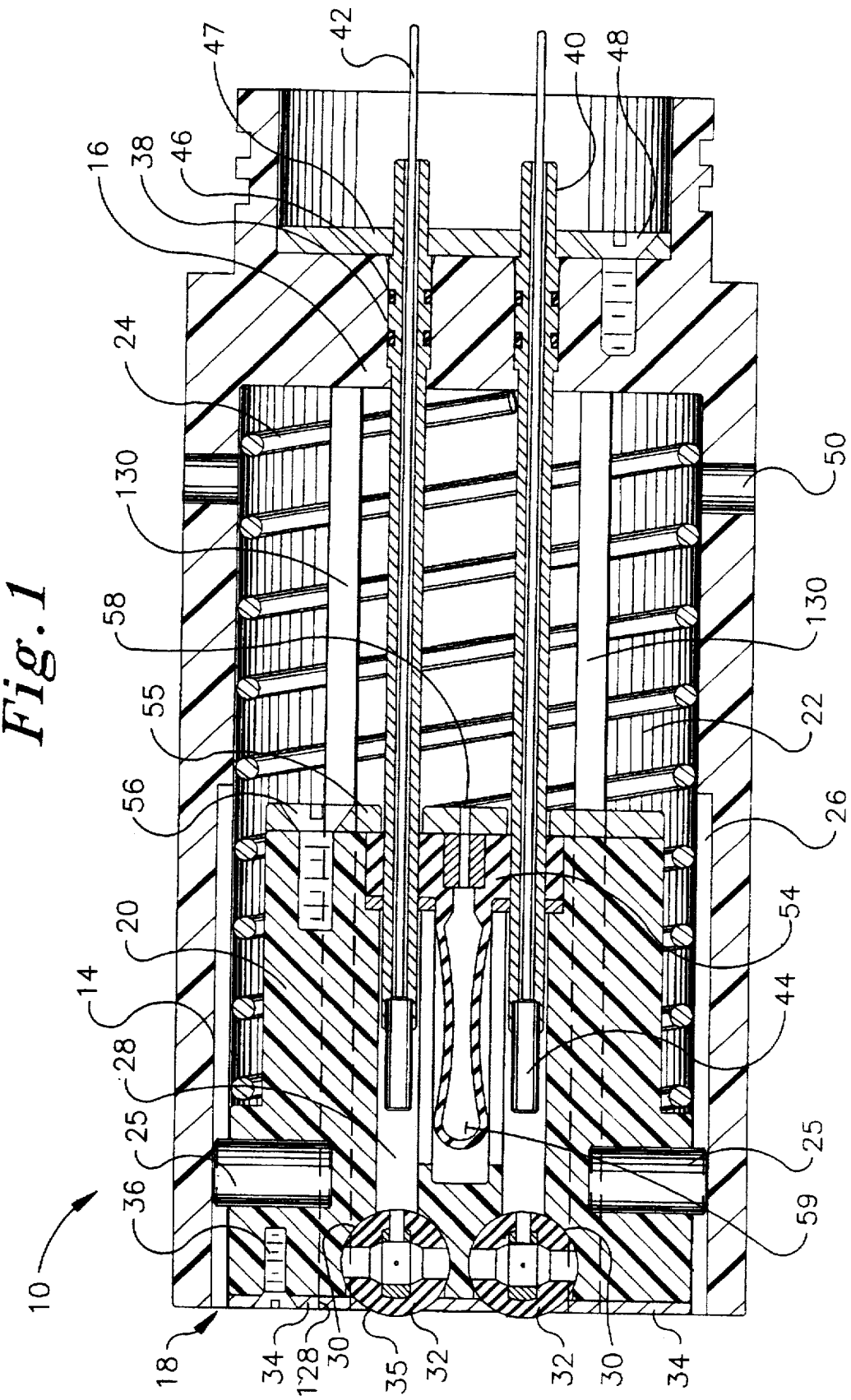
FIG. 1 is a longitudinal sectional view of a plug unit of a connector according to a preferred embodiment of the invention.
Figure 2:
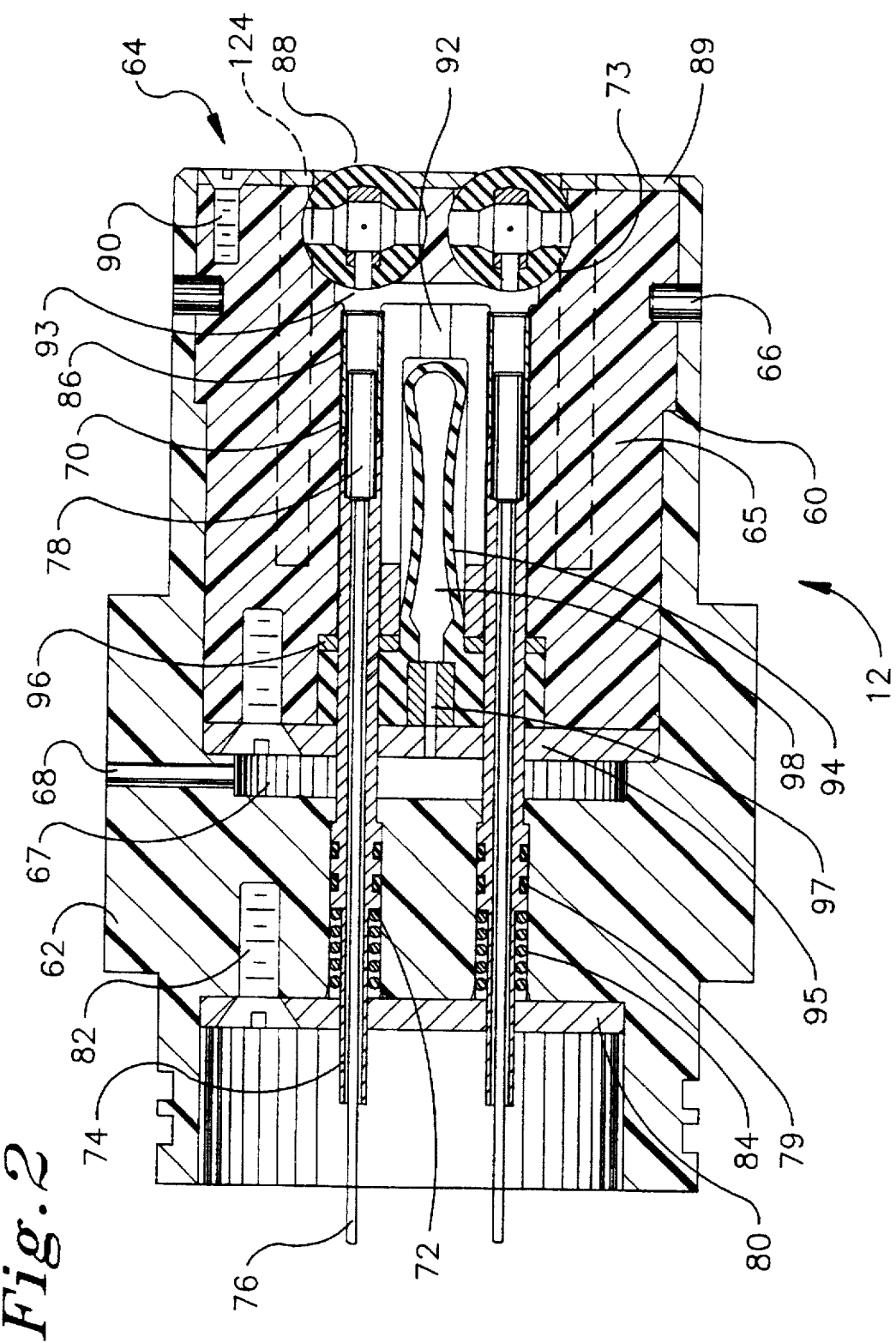
FIG. 2 is a longitudinal sectional view of a receptacle unit for mating engagement with the plug unit.
Figure 19:
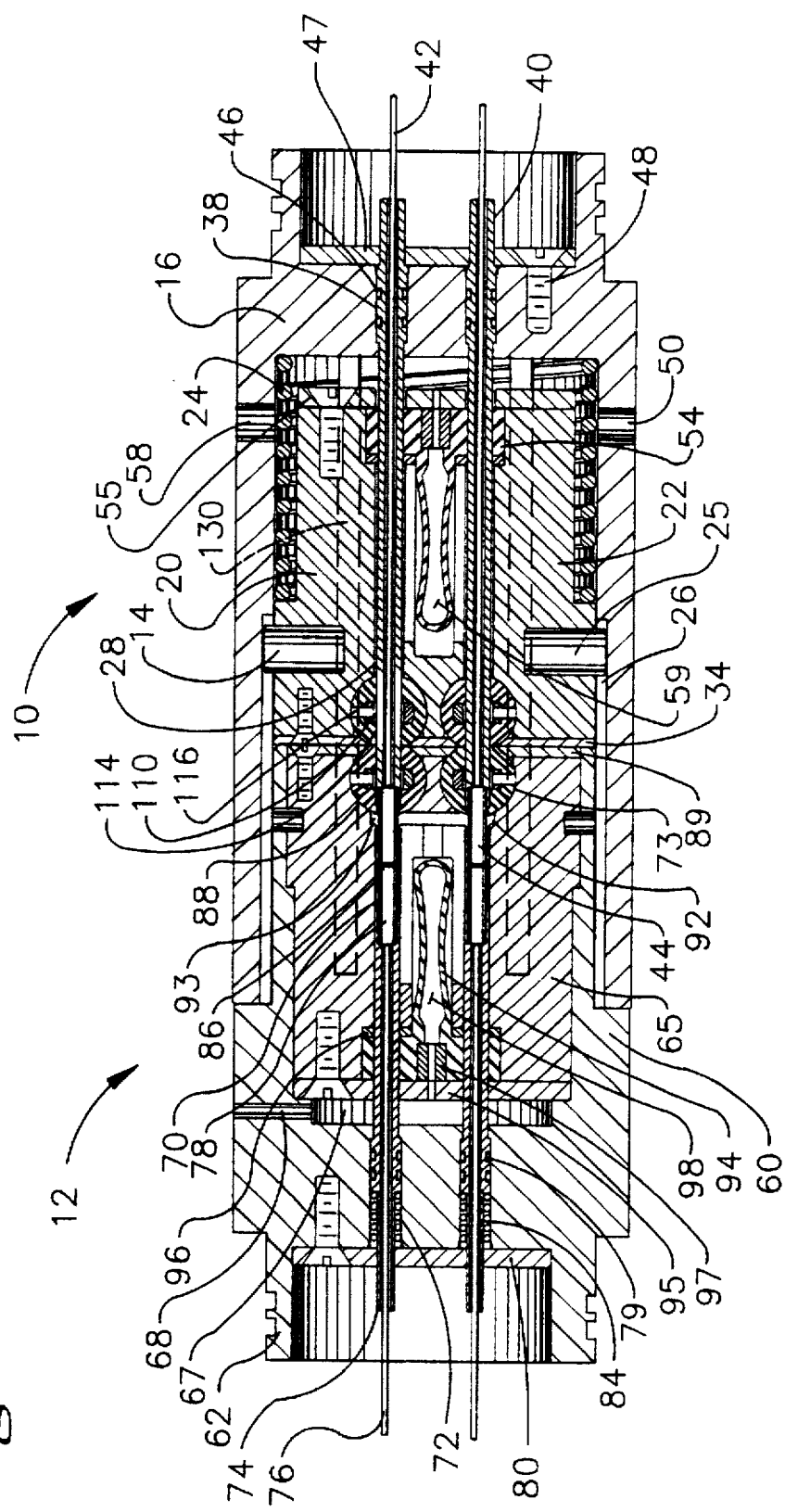
FIG. 19 is a view similar to FIGS. 16-18 but illustrating the two units fully engaged and connected.

The connector comprises a plug unit 10 as illustrated in FIG. 1 and a receptacle unit 12 as illustrated in FIG. 2 which interconnect to form an integral cylindrical connector as illustrated in FIG. 19. The plug unit 10 comprises an outer cylindrical shell 14 of rigid material having a sealed rear end wall 16 and an open forward end 18. A plug contact manifold 20 of rigid material is slidably mounted in plug chamber 22 and is biased by biasing spring 24 into the forward position illustrated in FIG. 1. Key pins 25 projecting outwardly from manifold 20 extend into axially extending keyways or slots 26 on the inner wall of shell 14 to prevent rotation of manifold 20 while allowing it to move axially.

The plug manifold has a series of parallel through bores 28 extending from the rear end to the forward end of the manifold. The number of bores depends on the number of connections to be made, which in this case is eight. Four of the bores will be located in the upper half of the manifold as illustrated in FIG. 1, and the other four will be located in the lower half of the manifold. The bores terminate in a pair of parallel, part-cylindrical recesses 30 located in the front face of the manifold, with the four upper bores terminating in one recess and the four lower bores terminating in the other recess. A pair of rolling seal devices 32 are rotatably mounted in the respective recesses 30, and are secured in place by means of end plate 34 which is secured across the front face of the plug manifold by retaining screws 36. End plate 34 has slots or openings 35 aligned with recesses 30, as best illustrated in FIG. 3.

A series of through bores 38 in the shell end wall 16 are each aligned with a respective one of the manifold through bores 28. A tubular housing 40 projects through each bore 38 and into the aligned bore 28 in manifold 20. Optical fibers 42 pass through the bores of tubular housings 40 and terminate to alignment ferrules 44 which are secured in seats at the end of the respective tubular housings 40. Connections of the fiber to the alignment ferrules are made using standard epoxy and polish techniques. When assembled, the epoxy is allowed to fill the bore of tubular housings 16 in such a way as to render the assembly without voids so that the assembly housed by the tubular housing 40 forms a pressure barrier. The rear end of the plug shell is suitably threaded or provided with other securing devices for connecting it to the end of a coaxial optical cable carrying optical fibers which are suitably connected to fibers 42. O-ring seals 46 are provided between each housing and the rear end wall bore 38 to seal the end wall. A backing plate 47 is secured over the rear end wall and housings 40 via mounting screws 48, and the assembly forms an impermeable high pressure barrier at the terminal end of plug unit.

Chamber 22 communicates with the external environment via vent ports 50. Plug manifold 20 has a central internal chamber 52 which communicates with each of the bores 28. An elastomeric barrier member 54 is mounted in the chamber 52 and held in place via backing plate 55 which is secured to the inner end of the manifold via screws 56. Orifice 58 in backing plate 55 connects the interior 59 of member 54 to the chamber 22, while the portions of chamber 52 on the opposite side of member 54 are filled with a dielectric, optically clear fluid. This fluid will therefore fill the forward end of each of the bores 28. Member 54 provides pressure compensation between the pressure of fluid inside and outside the seal unit by flexing inwardly or outwardly as appropriate.

The mating receptacle unit 12 also has a rigid outer shell 60 having a terminal or rear end wall 62 and an open forward end 64. A receptacle manifold block 65 of rigid material is secured in the shell 60 via retaining screws 66, leaving a chamber 67 between the rear end of block 65 and the end wall 62, which communicates with the exterior of the unit via vent port 68. A series of through bores 70 extend through the manifold block 65, terminating in a pair of part-cylindrical seats or recesses 73 at the forward end of block 65. The number of through bores corresponds to the number of connections to be made, as discussed above, and in this case four parallel bores are provided in the upper half of the manifold as viewed in FIG. 2, and four bores in the lower half, as best illustrated in FIG. 10. Aligned through bores 72 are provided in rear end wall 62, and tubular housings 74 project through bores 72 and into aligned bores 70, as illustrated in FIG. 2.

Optical fibers 76 pass through the bores of tubular housings 74 and terminate to alignment ferrules 78 which are secured in seats at the end of the respective tubular housings 74. Connections of the fiber to the alignment ferrules are made using standard epoxy and polish techniques. When assembled, the epoxy is allowed to fill the bore of tubular housings 74 in such a way as to render the assembly without voids so that the assembly housed by the tubular housing forms a pressure barrier. The rear end of the receptacle shell is suitably threaded or provided with other securing devices for connecting it to the end of a coaxial optical cable carrying optical fibers which are suitably connected to fibers 76. O-ring seals 79 are provided between each housing and the rear end wall bore 72 to seal the end wall. A backing plate 80 is secured over the rear end wall and housings 74 via mounting screws 82, and the assembly forms an impermeable high pressure barrier at the terminal end of receptacle unit. Springs 84 installed in counterbored portions of bores 72 are held in place by the backing plate 80. Contact alignment sleeves 86 are mounted in the forward ends of bores 70.

Rolling seal devices 88 are rotatably mounted in each of the seats 73 to seal the open forward ends of bores 72 in the closed position illustrated in FIG. 2. The seal devices are retained in the recesses by forward end plate 89 which is secured over the end of the shell and manifold block by fastener screws 90. End plate 89 has slots or openings 91 aligned with the recesses 73.

The manifold block 65 has a central, internal chamber 92 which communicates with the forward ends of bores 70 via passageways 93. A flexible compensator seal 94 is secured in the chamber 92 via backing plate 95 secured across the inner end of block 65 via screws 96. Plate 95 has a central orifice 97 which connects chamber 67 to the interior 98 of seal 94. The portions of chamber 92 on the other side of seal or barrier 94 are filled with a dielectric optically clear fluid.

The structure and assembly of the rolling seals 88 into the receptacle manifold block 65 will now be described in more detail with reference to FIGS. 4–12. It will be understood that the rolling seals 32 are installed in the plug manifold block 20 in an equivalent manner. The rolling seals 32 and 88 are of the same structure, and like reference numerals have been used for like parts as appropriate.

As best illustrated in FIGS. 5–8, each rolling seal 32 comprises a rigid core 100 over which an elastomeric roller or sleeve 102 is molded or otherwise affixed. The rigid core, which is of metal or hard plastic, has a flattened central segment 104 over which sleeve 102 is molded, and first and second projecting end portions 105,106 projecting from opposite ends of sleeve 102. End portion 105 is an enlarged diameter, disc-shaped segment having a stop pin projecting radially outwardly at a predetermined location on its outer surface, as best illustrated in FIG. 8. The flattened central segment 104 has through holes 110 passing transversely through it and transverse bleed holes 112 penetrate the through holes 110 from one side of the flattened segment, as best illustrated in FIGS. 7 and 8. The elastomeric sleeve 102 has through bores 114 which are aligned with holes 110 as illustrated in FIG. 6, and which are of slightly smaller diameter than holes 110. As illustrated in FIG. 7, the elastomeric sleeve also has bleed holes 116 extending perpendicular to bores 114 and aligned with bleed holes 112 in the solid core. Holes 116 extend from one side of the sleeve 102 and terminate at the junction with holes 112, unlike bores 114 which extend through the entire sleeve. The opposite end portion 106 of the solid core comprises a reduced diameter shaft having an annular groove 118 adjacent end 119.

FIGS. 3 and 4 illustrate the mating end faces of the plug and receptacle units, respectively, with the rolling seal ports 114 in the open position for clarity. As illustrated in FIG. 3, the plug shell has an axial keyway 120 extending from its end face, while the receptacle has an alignment key 122 which engages in keyway 120 to ensure that the parts are accurately oriented relative to one another on mating. The key and keyway 122,120 also prevent relative rotation between the parts as they are connected together, as explained in more detail below. Two actuator rod ports 124 of square section project inwardly through the end plate 89 into the manifold block 65 on one side of the rolling seal assembly, while a third port 126 of rectangular section extends inwardly on the opposite side of the seal assembly at a location between the two rolling seals. Corresponding passageways 128,129 are provided at equivalent locations on the mating end face of the plug unit, such that the passageways 128 are aligned with ports 124 while the passageway 129 is aligned with port 126 when the two parts are connected together. Passageways 128,129 extend through the end plate 34 and through the entire manifold body. Actuator rods 130 are fixed in the base or end wall 16 of the plug shell and extend slidably through passageways 128, and are of corresponding square cross-section. Actuator rod 132 is fixed at one end in end wall 16 and extends slidably through passageway 129, and is of corresponding rectangular cross-section. The ends of rods 130,132 are flush with the end face of plate 34 when the plug unit is disconnected from the receptacle unit, as illustrated in FIG. 1.

The front end portion of each manifold block is designed for mounting the respective rolling seals in the matching recessed areas while the projecting end portions of the rigid core are provided in corresponding regions provided in the manifold block for receiving those portions. FIGS. 9 and 10 are partially sectioned views of the receptacle manifold block 65 prior to installation of the rolling seals 88. It will be understood that the front end of the plug manifold block will be of equivalent structure, and like reference numerals have been used for like parts as appropriate. As illustrated, each part-cylindrical recess 72 for mounting of a seal 88 has a bore 134 at one end for rotatably receiving shaft portion 106 of the seal. Each recess 72 also has a set of spaced ports 135 extending into passageways 93. These ports will be aligned with the through bores 114 of the rolling seal when the seal is in the open position. An actuator chamber 138 is provided in the front end of the manifold block adjacent the opposite end of the two recesses 72, and the recesses are open at this end to communicate with the actuator chamber. As illustrated in FIG. 10, the ports 124 terminate at the inner end wall 139 of actuator chamber 138.

As noted above, the plug manifold block is of similar structure, except that the bore 134 and actuator chamber 138 are reversed, so that when the plug and receptacle unit are placed face to face with key 120 entering keyway 122, the seal members in the plug unit are oriented in the reverse direction to those in the receptacle unit, i.e. at 180° to the seal members 88. This can be seen in the schematic illustration in FIG. 13, where all parts except for the rolling seal members and actuator rods and bores have been eliminated for clarity. Thus, the actuator bore 129 in plug manifold block terminates in the end wall 139 of the plug actuator chamber 138. Each end plate has ports in alignment with the respective bores and ports 124,126,128 and 129 so that the actuator rods can project through the respective actuator chambers and into the aligned ports in the receptacle unit.

FIGS. 11 and 12 illustrate installation of one of the rolling seals 88 into a recess 72. The recess 72 is of slightly smaller diameter than the elastomeric sleeve 102. The rolling seal 88 is slid into the recess 72 via open end 136 so that the projecting shaft 106 extends through bore 134. An O-ring 140 is installed in groove 118 to retain the seal 88 in place. The enlarged end portion 105 will project out of the opposite end of the recess into enlarged or recessed area 138. The end of the elastomeric sleeve will seal the open end 136 of the recess 72 such that no water can enter the recess. End plate 89 is then secured over the manifold and installed seals, further capturing the rolling seals 88 as illustrated in FIG. 12.

Figure 13:
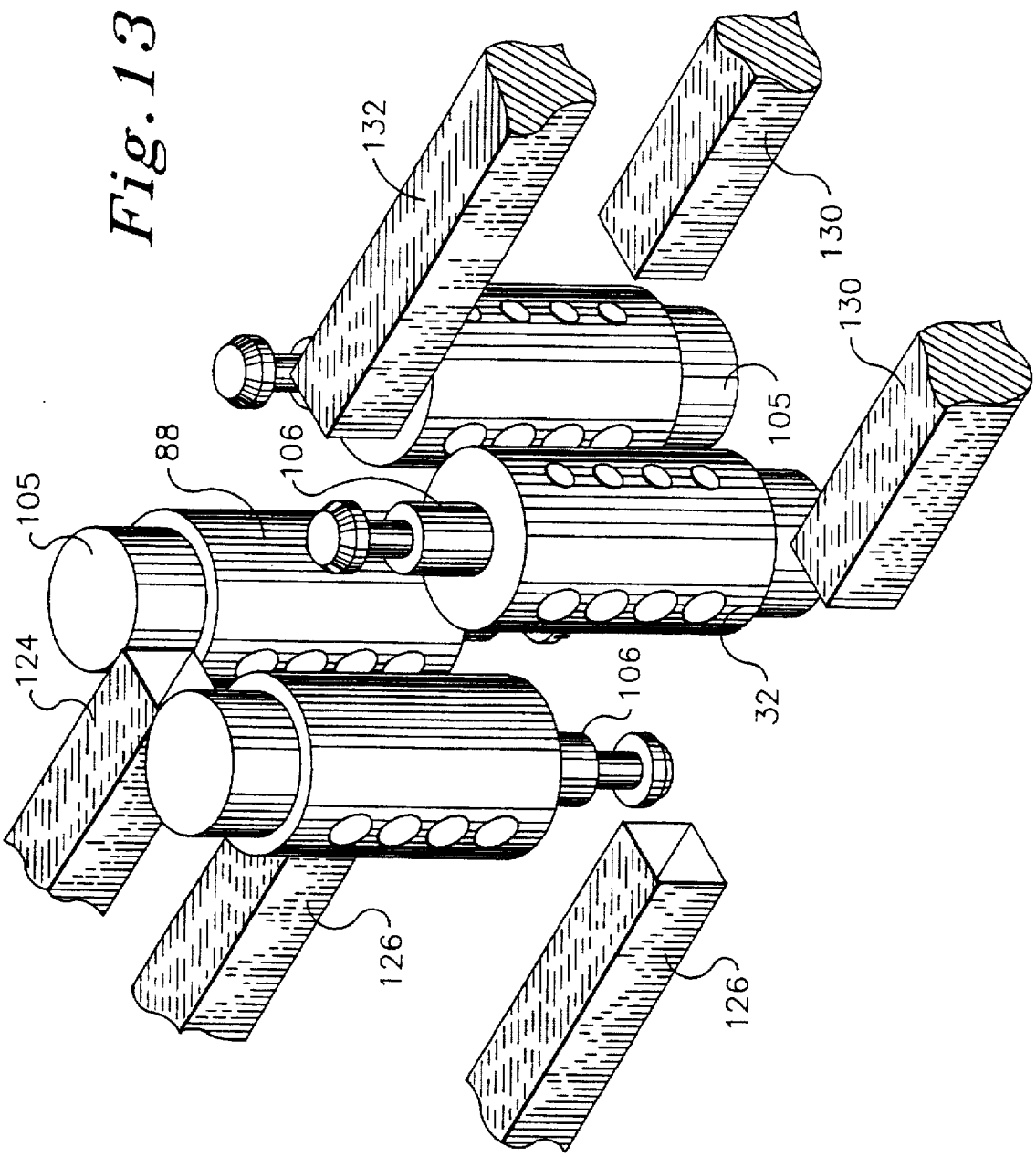
FIG. 13 is a perspective schematic view showing only the rolling seals and actuator rods and passages of the plug and receptacle units as they will be oriented prior to engagement of the seals.

Installation of the rolling seals 32 in the recesses 30 of the plug manifold will be identical, except for the fact that they are oriented in the opposite direction to the seals in the receptacle unit, as best illustrated in FIG. 13. Operation of the rolling seal assembly as the plug unit and receptacle unit are connected together can be better understood with reference to FIGS. 13–19. When the units are unconnected, each rolling seal will be in a closed position, as illustrated in FIGS. 13, 14A, 15A and 16. In this position, the through ports 114 extend parallel to the end faces of the units and the bores 28 and 86 carrying the optical fibers are sealed. At the same time, the bleed ports 112,116 connect ports 114 to the respective chambers 52,92 containing dielectric fluid, so that the ports 114 will all be filled with dielectric fluid.

Figure 15A:
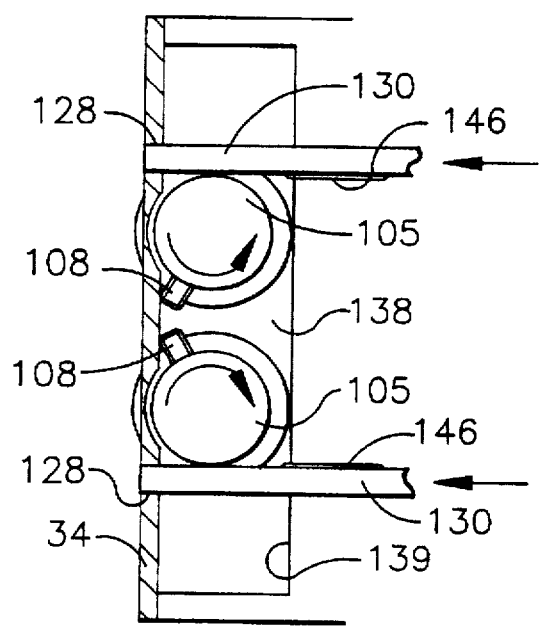
FIGS. 15A-D are partial side elevational views of the plug unit rolling seals and actuator rod at successive positions as the seal is rolled from a fully closed to a fully open position.
Figure 16:
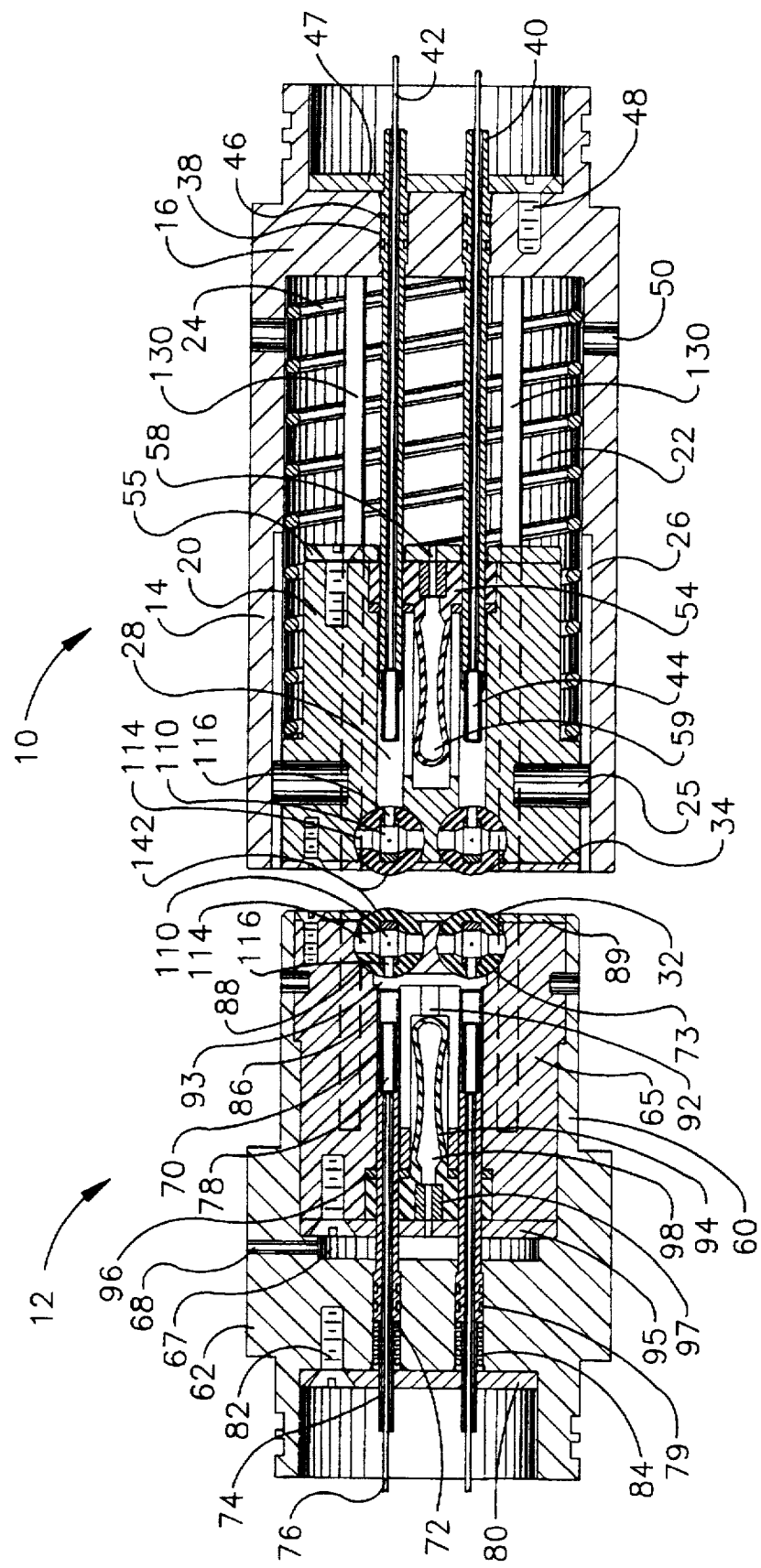
FIG. 16 is a longitudinal sectional view of the plug and receptacle units facing each other as they will be positioned prior to mating.

FIG. 16 illustrates the plug and receptacle units in juxtaposition prior to mating. It can be seen that elastomeric portions 142 project outwardly through the aligned openings 35,91 in end plates 34,89 respectively. As illustrated in FIG. 14A, the end portions 105 of rolling seals 88 in the plug unit which are located in recessed chambers or regions 138 of the receptacle manifold will be positioned with stop pins 108 engaging against an end wall 139 of the recessed region 138 when the seals are closed. Similarly, as illustrated in FIG. 15A, when the plug unit seals 32 are closed, the enlarged end portions 105 of each plug unit rolling seal are also located in an equivalent recessed region or chamber 138, but with the key pins 108 engaging the inner side of end plate 34, which acts as a stop. The actuator rods 130 extend through chamber 138 and engage the outer surface of the two end portions 105 tangentially, as illustrated in FIG. 15A and also in FIG. 13. The rods 130 extend into the holes or bores 128 in end plate 34, but do not project out through end plate 34 when the plug unit is unmated. Each rod 130 has a raised portion 146 on its inner face which is designed to frictionally engage the outer surface of the respective end portion 105, as explained in more detail below.

The actuator rod 132 extends into aligned port 129 at the opposite side of the seal assembly at a location between the two end shafts 106, and will be aligned with port 126 which communicates with chamber 138 of the receptacle unit. The rod 132 has raised regions 148 on its opposite faces which are located for tangential frictional engagement with the end portions 105 of rolling seals 88 when the rod 132 enters chamber 138. FIG. 14A illustrates the position of rod 132 relative to the end plate of the receptacle manifold when the two units are initially brought into face to face engagement.

Figure 17:
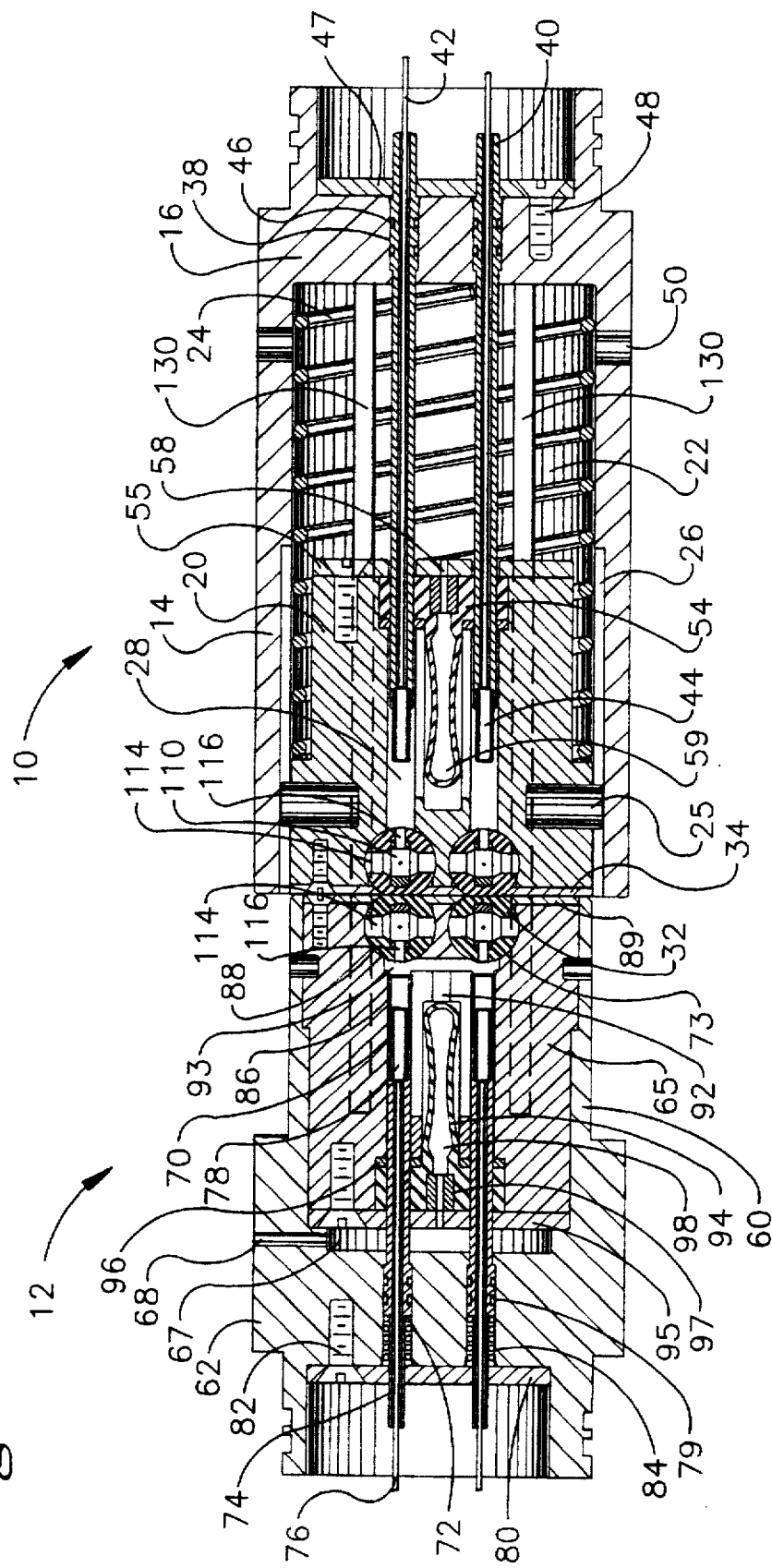
FIG. 17 is a view similar to FIG. 16 illustrating a subsequent stage in the mating procedure in which the two units have just come into engagement.
Figure 18:
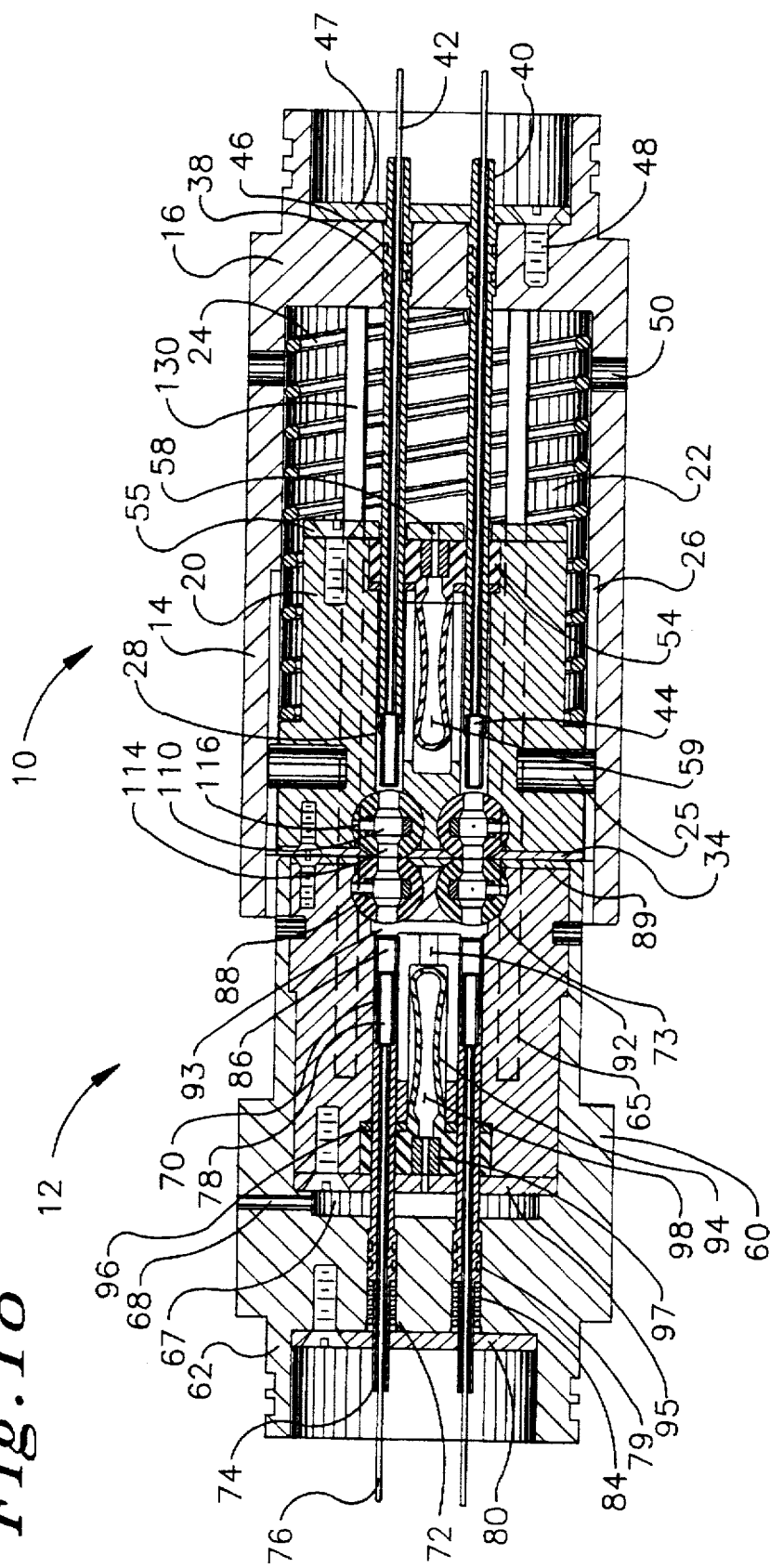
FIG. 18 is a view similar to FIGS. 16 and 17 illustrating a stage in which the seals have been rotated open and the connector is partially engaged.

In FIG. 17, the connector units are pressed together in the first stage of mating operation, in which the projecting portions 142 of the plug and receptacle rolling seals 88 are flattened, effectively expelling water from between their opposing faces and sealing the faces of the rolling seals of the plug to those of the receptacle. There may be debris trapped between the opposing seal faces at this point. As the connector units are pushed further together, with key 122 entering keyway 120, spring 24 of the plug unit begins to compress as the plug manifold is urged inwardly. At the same time, the rods 130 and 132 will begin to protrude outwardly through the ports 128 and 129 and will enter the aligned ports 124 and 126. Thus, as the receptacle continues into the plug-unit shell, it will be impaled by the rods 130 and 132, as illustrated for rod 132 in FIGS. 14B, 14C and 14D. FIG. 14B shows partial penetration of the actuator rod 132 into chamber 138. The raised portions 148 have just engaged the surface of the two cylindrical end portions 105. As the rod 132 continues inwardly, the raised portions 148 will start to roll the two rolling seals about their longitudinal axes in the directions of the arrows, as illustrated in FIG. 14C. FIG. 14D illustrates the final position in which the stop pins 108 of each end portion 105 have engaged the inner surface of end plate 89, preventing any further rotation. In this position, the rolling seals have rotated through 90° so that through bores 114,110 are aligned with bores 72, as also illustrated in FIG. 18. Thus, the stop pins 108 permit the rolling seals 88 to rotate between a closed position in which the pins 108 abut the inner end wall 150 of recessed region 138, as in FIG. 14A, and an open position in which the pins 108 abut end plate 89, as in FIG. 14D.

Figure 15B:
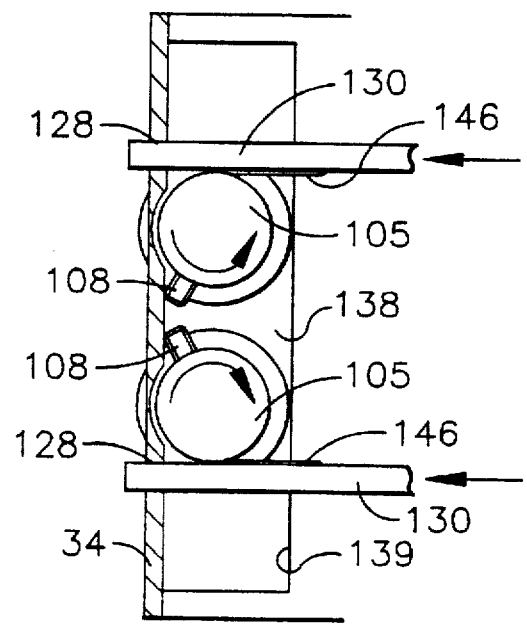
Figure 15C:
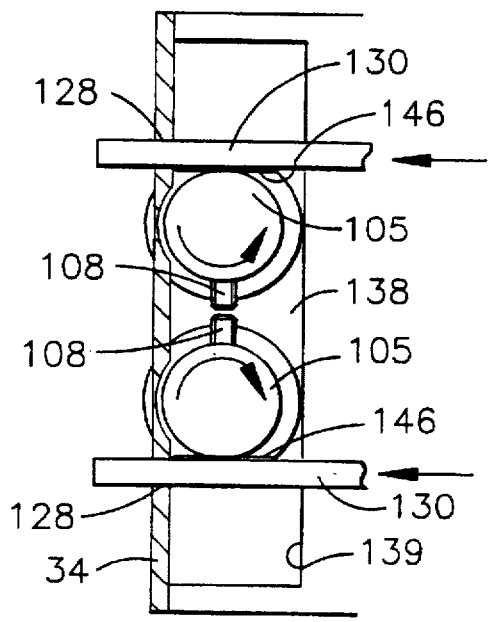
Figure 15D:
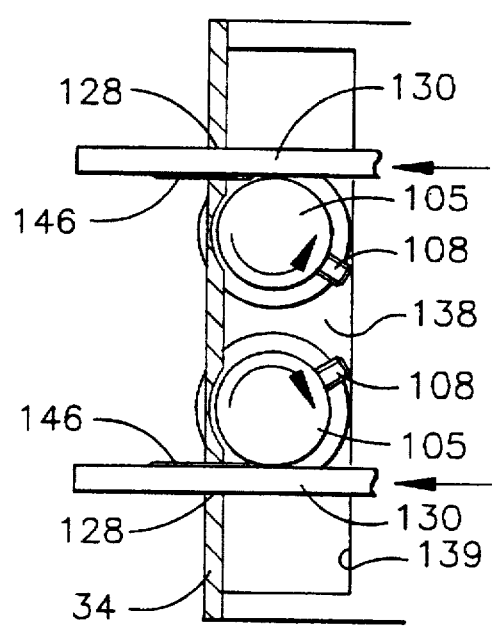

While the rod 132 is extending into the receptacle unit at the larger end portions of the rolling seals, rods 130 at the same time will start to enter the ports 124, and in doing so travel progressively through chamber or region 138 of the plug manifold as the manifold continues to be pushed inwardly further into shell 14. The progress of rods 130 through region 138 of the plug manifold is illustrated in successive stages in FIGS. 15B, 15C and 15D. In FIG. 15B, the raised regions 146 on the inner faces of rods 130 have just begun to engage the enlarged portions 105 of the two seals 32. As the manifold is pushed further inward, the regions 146 travel over the surface of portions 105, simultaneously causing the portions 105 to rotate the seals about their longitudinal axes in the direction of the arrows in FIG. 15. FIG. 15C illustrates partial actuation of the rolling seals 32. In FIG. 15D, stop pins 105 contact the inner wall 139 of recessed region 138 to prevent any further rotation. In this position, the ports 110,114 will be in an open position aligned with bores 28, as illustrated in FIG. 18.

The relationship between the raised portions of the rods 130 and 132 is such that the receptacle and plug rolling seals are actuated simultaneously and in opposite directions. As noted above, in FIG. 17 the two units are shown in an intermediate position in which the end plates are in face to face engagement and the receptacle shell has not yet entered the plug shell to push the plug manifold inwardly. As the units move from the position of FIG. 17 to that of FIG. 18, in which the plug manifold has been pushed partially inwardly, the rolling seals have all been rolled through 90° so that the bores are all open and connected from the receptacle unit into the plug unit. Prior to movement into the open position, the rolling seal through bores will all be filled with dielectric fluid via the bleed ports. If any debris is trapped between the mating end faces of the rolling seals in FIG. 17, it will be rolled outwardly to one side of the seals as these faces rotate, and away from the region of the aligned bores. The dielectric fluid filling the seal bores as they rotate into the open position will help to prevent any seawater from entering the bores.

As the mating sequence progresses beyond the point illustrated in FIG. 18, the plug manifold is pushed further inwardly and the plug contacts will pass through the aligned ports 114 of the rolling seals 32 and 88, eventually penetrating alignment sleeves 86 and making contact with the faces of optical ferrules 78 within the fluid bath of the receptacle. The fully engaged connector is illustrated in FIG. 19. It can be seen that the spring 24 is compressed and the enlarged diameter portion of the receptacle shell has bottomed out on the end rim 18 of the plug shell. When passing through the rolling end seals, the tubular contact housings 40 of the plug will expand the elastomeric bores 114 of the rolling seals, so that the bores grip and seal to the outer surfaces of the tubular contact housings. A double seal is provided in both the plug and receptacle, trapping a closed bath of fluid within the end seals. Double end seals are considered to be advantageous for electrical connectors as well as optical connectors, and it will be understood that the same assembly may be used for an electrical underwater connector, with the optical fibers replaced with electrical conductors passing through rigid, non-conductive tubular contact housings and being mechanically and electrically connected to ferrules at their ends. The ferrules in this case will be made of a conductive material.

As the connector units are mated together, the relative movement between the units leading to the engagement of the plug and receptacle contact elements or ferrules will cause the volume within the oil chambers or baths of the plug and receptacle to change. These changes, in addition to changes which may occur due to variations in temperature and pressure, are compensated by flexing of the thin walled elastomeric baffles or barriers, 54 and 94, which thereby change their shape to accommodate such volume changes. These compensators vent to the outside environment via the vent ports 50 and 68.

Any standard coupling device may be used to retain the connected plug and receptacle unit in their connected condition as in FIG. 19, as will be understood by those skilled in the field. When the units are demated, the movements of the plug contacts and seal actuator rods are reversed, with the actuator rods acting to rotate all the rolling seals back in the opposite direction until they are in the full closed position of FIG. 16 again. This arrangement will prevent any seawater from entering the sealed oil chambers of the plug or receptacle as these units are mated and demated. It will be understood that many alternative mechanisms may be used to actuate the rolling seals. For example, the frictional engagement between the actuator rods and projecting end portions 105 may be replaced with rack and gear wheel mechanism, with the end portions 105 having gear teeth and the actuator rods being replaced with rack gears. Other alternative actuator mechanisms may be used, such as a keying mechanism or cam device.

The rotating seal members are cylindrical in the preferred embodiment, but other alternative shapes may be used which have rounded mating surfaces for permitting the seal members to rotate in their mating seats. For example, the seal members may be spherical in a single contact connector.

The seals in this invention act in the manner of a plug valve to move physically between sealed and open positions only when the plug and receptacle unit are secured together, so that the seal is much more reliable than previous arrangements which required the seal to close on itself and thus became less reliable as the elastomeric material lost its "memory". It will be understood that rollable shapes other than cylindrical may be used for the mating seals and recesses, such as spherical or part-spherical. The arrangement of this invention provides a double end seal in each of the units which traps a fluid bath within the body of each end seal, further resisting entry of any moisture into the seal units.

Although rolling seals are used in the preferred embodiment described above, elongate seal members which shift back and forth axially across the front end of the respective connector units may be used in alternative embodiments. In this case, each seal member will be slidably mounted in a seat extending transversely across a front end wall of the connector unit, retained behind an end plate with openings aligned with the contact bores. Suitable actuators will be used to move each seal member between an inoperative position in which openings in the seal member are offset from the end plate openings and an operative position in which the seal openings are aligned with the end plate openings.

Although a preferred embodiment of the invention has been described above by way of example only, it will be understood by those skilled in the field that modifications may be made to the disclosed embodiment without departing from the scope of the invention, which is defined by the appended claims.

I claim:

1. A connector assembly comprising:

a receptacle unit having a rear end, a front end, and a longitudinal axis, at least one bore extending inwardly from the front end of the receptacle unit;

the front end of the receptacle unit having at least one recessed seat and said bore terminating in said seat;

a receptacle contact element mounted in said bore;

a seal member movably mounted in said seat, the seal member having at least one through bore, and being movable in a non-axial direction relative to said receptacle unit between a first, closed position in which said through bore is offset from said receptacle bore and the end of said receptacle bore is sealed, and a second, open position in which said seal through bore is aligned with said receptacle bore; and a plug unit having a rear end and a front end for engagement with the front end of the receptacle unit, the front end of the plug unit having at least one opening aligned with the bore in the receptacle unit and a contact element slidably mounted in the plug unit for projecting out of the opening and through the seal member bore into the receptacle unit bore to contact the receptacle contact element when the seal member is in the open position.

2. The assembly as claimed in claim 1, wherein the receptacle unit has a series of parallel bores each containing a contact element, each of the bores terminating in a respective said recessed seat, and said seal member has a series of parallel through bores each corresponding to a respective one of said receptacle unit bores and aligned with said bores when the seal member is in the open position.

3. The assembly as claimed in claim 2, wherein said seal member is cylindrical and said seat is of part-cylindrical shape and dimensions substantially matching the dimensions of the cylindrical seal member, the seal member being rotatably mounted in said seat for rotation about the longitudinal axis of said seal member, and the seal through bores extend transversely through said cylindrical seal member.

4. The assembly as claimed in claim 2, wherein the receptacle unit has multiple recessed seats in said front face, and multiple series of parallel bores, each series of bores terminating in a respective one of said seats and each bore containing a contact element, and said plug unit has multiple sets of parallel bores, each set of bores being aligned with a respective series of said parallel bores in said receptacle unit when said units are connected together, and a contact element slidably mounted in each of the plug unit bores for mating engagement with said receptacle contact elements when said seal members are open and said contact elements project through said seal bores into said receptacle bores.

5. The assembly as claimed in claim 1, wherein said seal member includes a portion projecting outwardly from said front face in said closed position.

6. The assembly as claimed in claim 1, wherein the front face of said plug unit has a recessed seat and said plug unit bore terminates in said seat, and a plug seal member is mounted in said recessed seat of said plug unit, said plug seal member having a through bore and being movable between an open position in which said through bore is aligned with said plug unit bore and a closed position in which said through bore is offset from said plug unit bore and said plug unit bore is sealed.

7. The assembly as claimed in claim 6, wherein each of said recessed seats is elongated in a direction transverse to said plug and receptacle unit bores, said seats including rotatable mounting means for mounting said respective seal members for rotating about the longitudinal axes of said seats.

8. The assembly as claimed in claim 7, wherein each seal member projects partially outwardly from the front end of the plug and receptacle unit, respectively, whereby said projecting portions are compressed when the units are positioned with the front ends in mating engagement.

9. The assembly as claimed in claim 7, wherein each seal member is cylindrical and each seat is of part-cylindrical shape and of dimensions substantially matching the dimensions of said seal members.

10. The assembly as claimed in claim 9, wherein each seal member comprises a rigid core rod and an elastomeric sleeve mounted on said core rod.

11. The assembly as claimed in claim 10, wherein said rigid core rod has at least one end portion projecting from one end of said sleeve, and each seat has a central opening at one end for rotatably receiving said projecting end portion to rotatably position said elastomeric sleeve in said seat.

12. The assembly as claimed in claim 10, wherein said rigid core rod has an enlarged end portion outside said sleeve at one end of the sleeve, and each of said plug and receptacle units has a recessed region at said front end and an opening connecting said seat to said recessed region, said enlarged end portion being located in said recessed region.

13. The assembly as claimed in claim 12, wherein said recessed region in said receptacle unit is located at one end of said seat and said recessed region in said plug unit is located at the opposite end of the plug unit seat when said front faces are oriented for mating engagement between said plug and receptacle units.

14. The assembly as claimed in claim 13, wherein said plug unit has at least two actuator rod mounting bores and said receptacle unit has at least two actuator rod receiving bores aligned with said mounting bores, a first one of said actuator rod mounting bores extending into said recessed region of said plug unit and the second one of said actuator rod mounting bores being aligned with the recessed region of said receptacle unit, and first and second actuator rods slidably extending through said first and second actuator rod mounting bores, respectively, said rods being movable between a retracted position within said mounting bores and an extended position extending out of said bores and into said aligned receiving bores as said plug and receptacle units are secured together, the first rod comprising means for frictionally engaging the outer surface of the enlarged portion of the plug seal member to rotate the seal member from the closed to the open position as the rod moves from the retracted to the extended position, and the second rod comprising means for frictionally engaging the outer surface of the enlarged portion of the receptacle seal member and rolling the seal member from the closed to the open position as the rod moves from the retracted to the extended position.

15. The assembly as claimed in claim 6, including an actuator device for rotating said opposing seal members of said plug and receptacle unit in opposite directions in moving between said closed and open positions, whereby moisture or debris is propelled away from the seals.

16. The assembly as claimed in claim 1, wherein the receptacle unit has an internal chamber communicating with the contact element bore, the chamber and bore being filled with a benign fluid, and the seal member has at least one bleed port extending from one side of the member transversely into the seal through bore, the bleed port being aligned with the bore in the receptacle unit when the seal member is in the closed position, whereby the through bore is filled with fluid.

17. The assembly as claimed in claim 6, wherein said receptacle and plug units each have an internal chamber communicating with the respective contact element bore, the chamber and bore being filled with a benign fluid, and each seal member has at least one bleed port extending from the outer surface of said member transversely into the through bore, the respective bleed ports being aligned with the receptacle unit bore and plug unit bore and communicating with said bores in the closed position of said seal members, whereby each seal member through bore is filled with fluid.

18. A connector assembly, comprising:
a plug unit having a rear end and a front end, and a first bore extending to the front end of the plug unit, the front end having a first recessed seat of enlarged dimensions into which said first bore extends;
at least one contact element slidably mounted in said first bore for movement between a retracted position within said bore and an extended position projecting forwardly through the front end of the plug unit;
a first seal member movably mounted in said recessed seat, the seal member having a through bore and being movable between an open position in which said through bore is aligned with said first through bore and a closed position in which said through bore is offset from said first through bore and the first through bore is sealed;
a receptacle unit having a rear end and a front end for engaging the front end of the plug body in a predetermined orientation when the receptacle and plug units are connected together;
a second bore extending inwardly into said receptacle unit from said front end, the front end of the receptacle unit having a second recessed seat of shape and dimensions matching those of said first recessed seat, the second bore extending into said second recessed seat and being aligned with said first bore when said plug and receptacle unit are positioned in said predetermined relative orientation for mating engagement;
at least one contact element mounted in said second bore;
a second seal member movably mounted in said second recessed seat, the second seal member having at least one through bore and being movable between an open position in which said through bore is aligned with said second bore and a closed position in which said through bore is offset from said second bore and said second bore is sealed; and
an actuator mechanism for actuating each of said seal members to move from said closed to said open position as said receptacle unit is connected to said plug unit, whereby said plug contact element projects through the aligned through bores in said open seal members and into said second bore to engage said receptacle contact element.

19. The assembly as claimed in claim 18, wherein the recessed seats each have a cross-sectional area less than the cross-sectional area of the seal members, and each seal member has a portion projecting outwardly from the recessed seat and the front end of the respective unit, whereby said projecting seal portions are compressed when said front ends are positioned in face to face engagement prior to connection of said units.

20. The assembly as claimed in claim 18, wherein said plug and receptacle units each have an internal sealed chamber connected to said respective contact element bores, the sealed chamber and contact element bores being filled with a benign fluid, and each seal member has a bleed port connecting said through bore to said sealed chamber in the closed position of the seal member, whereby the seal member through bores are filled with fluid from said chambers in the closed position of said seal members.

21. The assembly as claimed in claim 18, wherein each recessed seat has a curved surface and each seal member has a matching curved surface and is rotatably mounted in said respective seat for rotation between said closed and open positions.

22. The assembly as claimed in claim 21, wherein each seal member comprises a cylindrical roller rotatably mounted in the respective seat having at least one transverse through bore, and each recessed seat is of part-cylindrical shape and dimensions substantially matching the dimensions of the cylindrical roller, whereby said roller is rotatable about its longitudinal axis to move said seal member from the closed to the open position.

23. The assembly as claimed in claim 22, wherein each seal member comprises a rigid central rod and an elastomeric roller mounted on said rod with an end portion of said rod projecting from one end of said roller to form said projecting shaft.

24. The assembly as claimed in claim 22, wherein the plug unit and receptacle unit each have a set of spaced parallel bores aligned with corresponding bores in the other unit and each terminating in said recessed seat, each bore containing a respective contact element, and said cylindrical rollers each have a plurality of spaced parallel transverse through bores, each transverse through bore being aligned with a respective bore in the respective plug and receptacle units in the open position of said seal member.

25. The assembly as claimed in claim 24, wherein the plug unit and receptacle unit each have multiple sets of spaced parallel bores aligned with corresponding bores in said multiple sets of bores in the other unit, the front end of the plug unit and receptacle unit each having a plurality of recessed seats, each set of bores terminating in a respective one of the recessed seats, and a rotating seal member is rotatably mounted in each of the recessed seats of the plug and receptacle unit, respectively.

26. The assembly as claimed in claim 21, wherein said actuator device includes a first actuator portion for rotating the first seal member in a first direction between the closed and open positions and a second actuator portion for rotating the second seal member in a second direction opposite to the first direction between the closed and open positions.

27. The assembly as claimed in claim 26, wherein said plug and receptacle units each have an enlarged chamber adjacent one end of said recessed seat, each seat having an opening at said one end communicating with said chamber, and each seal member has an end portion projecting through said opening into said chamber, said plug unit having at least two parallel actuator bores extending through said front end, at least one of said actuator bores intersecting said enlarged chamber in said plug unit, said receptacle unit having at least two parallel actuator bores aligned with the actuator bores in said plug unit, at least one of said actuator bores in said receptacle unit intersecting said enlarged chamber at the front end of said receptacle unit, at lease two actuator rods in said plug unit, each actuator unit being mounted in a respective one of said actuator bores and being movable between a retracted position within said bore and an extended position projecting out of the front end of the plug unit and into the aligned actuator bore in said receptacle unit, said first actuator portion being provided on a first one of said actuator rods which extends through the enlarged chamber in the plug unit and the second actuator portion being provided on a second one of said actuator rods which extends into the enlarged chamber of the receptacle unit when in said extended position, said actuator portions comprising means for engaging the extended portions of the respective seal members to rotate said seal members as said rods move from the retracted to the extended positions.

28. The assembly as claimed in claim 18, wherein said plug unit comprises a hollow shell with a fixed rear end and an open front end, and a plug body slidably mounted in the shell, the plug body having a rear end and a forward end face defining the front end of said plug unit;

said first bore comprising a through bore extending through the plug body;

said first contact element having a first end secured to the rear end of the plug unit and projecting forwardly into the through bore;

the receptacle unit being dimensioned for engagement in said hollow shell to push said plug body rearwardly as said units are connected together, whereby said contact element projects out of the front end of the plug body into the receptacle unit bore;

the plug body having an actuator through bore spaced from the first bore and extending tangential to the rolling seal member;

the receptacle unit having an actuator port aligned with said actuator through bore in said predetermined relative orientation; and the actuator mechanism comprising at least one actuator rod having a first end secured to the rear end of the plug shell and projecting forwardly into said actuator through bore, whereby said actuator rod projects out of said actuator through bore and into said actuator port in said receptacle unit when said units are connected together;

the actuator rod having a surface for engaging the outer periphery of the seal member to move the seal member from the closed to the open position as said actuator rod is pushed out of said plug unit into said receptacle unit.

29. A method of connecting one contact element to another contact element in a sealed environment, comprising the steps of:

taking a plug unit containing a first contact element, the plug unit having a front end and the contact element being extendible out of the front end of the plug unit in an advanced position and located within the plug unit in a retracted position;

taking a receptacle unit containing a second contact element in a sealed chamber within the receptacle unit, the receptacle unit having a front end with an opening communicating with the sealed chamber and a seat between the opening and chamber for seating a seal member which is movable in the seat between a closed position in which the connection between the opening and chamber is sealed and an open position in which the opening is connected to the chamber;

placing the plug and receptacle units with their front ends in face-to-face engagement and the first contact element aligned with the second contact element while the seal member is in the closed position in which a through bore in the seal member is offset from the opening in the front end of the receptacle unit;

moving the seal member from the closed position to the open position in which the through bore is aligned with the opening, the seal member moving in a direction which is non-axial relative to the longitudinal axis of the plug and receptacle units;

advancing the first contact element through the opening in the front end of the receptacle unit and into the chamber to contact the aligned second contact element; and releasably connecting the plug and receptacle units together.

30. The method as claimed in claim 29, wherein the seal member is cylindrical and has at least one through bore extending transversely through the cylinder, and the step of moving the seal member comprises rotating the cylinder about the longitudinal axis of the cylinder.

31. A connector assembly for connecting one contact element to another contact element in a sealed environment, comprising:

a plug unit and a first contact element mounted in the plug unit, the plug unit having a first end and the contact element being extendible out of the front end of the plug unit in an advanced position and located within the plug unit in a retracted position;

a receptacle unit having longitudinal axis and a sealed chamber, and a second contact element mounted within the sealed chamber of the receptacle unit, the receptacle unit having a front end with an opening communicating with the sealed chamber and a seat between the opening and chamber;

a seal member having at least one through bore movably mounted in the seat for movement in a non-axial direction relative to the longitudinal axis of the receptacle unit between a closed position in which the through bore is offset from the opening and the connection between the opening and chamber is sealed and an open position in which the through bore is aligned with the opening and the opening is connected to the chamber; and the plug and receptacle units being releasably connectable together and the seal member being positioned in the closed position when the units are not connected, whereby the seal member is moved from the closed to the open position when the units are placed in face-to-face engagement and urged together prior to advancing the first contact element through the opening for contact with the second contact element.

32. The assembly as claimed in claim 31, wherein the seat has an at least partially curved surface and the seal member has a corresponding curved surface for rolling engagement with the seat, whereby the seal member is in rolling engagement with the seat for rolling between the closed and open positions.

33. The assembly as claimed in claim 32, wherein the seal member is cylindrical and has at least one through bore extending transversely through the cylinder, the seat is at least partially cylindrical and of dimensions for rotatably receiving the cylinder, and the cylindrical seal member is rotatably mounted in the seat for rotation about the longitudinal axis of the cylinder.

* * * * *